(12) United States Patent
Johnson et al.

(10) Patent No.: US 7,399,255 B1
(45) Date of Patent: Jul. 15, 2008

(54) ENGINE AND TRANSMISSION CONTROL SYSTEM AND METHOD FOR A VEHICLE ACCESSORY

(75) Inventors: Chad B Johnson, Ham Lake, MN (US); Brian J Hitt, Forest Lake, MN (US); Scot A. Taylor, Forest Lake, MN (US); Craig R Vander Ploeg, Roseville, MN (US)

(73) Assignee: Polaris Industries Inc., Medina, MN (US)

( * ) Notice: Subject to any disclaimer, the term of this patent is extended or adjusted under 35 U.S.C. 154(b) by 313 days.

(21) Appl. No.: 11/150,573

(22) Filed: Jun. 10, 2005

(51) Int. Cl.
*B60K 31/00* (2006.01)
*B60K 17/28* (2006.01)
*F16H 37/00* (2006.01)

(52) U.S. Cl. .............. 477/42; 74/11; 180/53.8
(58) Field of Classification Search .............. 477/37, 477/39, 42, 80; 74/11, 15.66, 15.8, 15.82, 74/15.86, 665 G; 180/53.1, 53.6, 53.61–53.62, 180/53.7–53.8; 475/207–210, 214
See application file for complete search history.

(56) References Cited

U.S. PATENT DOCUMENTS

| 4,191,270 | A | * | 3/1980 | Monteith | .............. 180/53.4 |
| 4,546,673 | A | | 10/1985 | Shigmatsu et al. | |
| 5,073,157 | A | | 12/1991 | Herscovici | |
| 5,074,373 | A | | 12/1991 | Schmidt | |
| 5,971,888 | A | * | 10/1999 | Goode | .............. 477/107 |
| 5,976,056 | A | | 11/1999 | Matsumoto et al. | |
| 6,017,290 | A | | 1/2000 | Kinoshita et al. | |
| 6,022,290 | A | | 2/2000 | Lyon | |
| 6,030,316 | A | | 2/2000 | Kadota | |
| 6,129,187 | A | * | 10/2000 | Bellanger et al. | .......... 192/3.58 |
| 6,135,913 | A | | 10/2000 | Lyon | |
| 6,138,069 | A | | 10/2000 | Ellertson et al. | |
| 6,267,189 | B1 | * | 7/2001 | Nielsen et al. | .............. 180/53.1 |
| 6,449,548 | B1 | | 9/2002 | Jain et al. | |
| 6,615,963 | B2 | * | 9/2003 | Ono et al. | .............. 192/3.63 |
| 6,837,825 | B2 | * | 1/2005 | Nakayama et al. | ............. 477/48 |
| 6,942,595 | B2 | * | 9/2005 | Hrazdera | .............. 477/37 |
| 2006/0252597 | A1 | * | 11/2006 | Williams | .............. 477/107 |

FOREIGN PATENT DOCUMENTS

JP 61092355 A * 5/1986
WO WO9906237 A * 2/1999

OTHER PUBLICATIONS

Translation of WO 9906237A. http://www.worldingo.gcom/wl/epo.html, Dec. 12, 2007.*

* cited by examiner

*Primary Examiner*—Roger Pang
(74) *Attorney, Agent, or Firm*—Baker & Daniels LLP (57) ABSTRACT

A control system for a vehicle having an accessory generally includes a transmission coupled to an engine and a power take-off unit having an output speed and an output torque. The power take-off unit is coupled to the transmission and adapted to releaseably couple to the accessory. A drivetrain is selectively coupled to the transmission and a control module controls at least one of the output speed and the output torque of the power take-off unit.

47 Claims, 3 Drawing Sheets

ENGINE AND TRANSMISSION CONTROL SYSTEM AND METHOD FOR A VEHICLE ACCESSORY

CROSS-REFERENCE TO A RELATED APPLICATION

This application is related to commonly assigned U.S. patent application Ser. No. 11/150,574, filed on Jun. 10, 2005, entitled Engine and Transmission Control System and Method for Motorized Vehicle to Hitt et al. The above disclosure is hereby incorporated by reference as if fully set forth herein.

FIELD

The present invention relates to an engine and transmission control system and method and more specifically relates to a control system and method to control an engine and a transmission speed for a vehicle accessory.

BACKGROUND

Recreation and utility vehicles are becoming more popular and are being utilized for a range of tasks. In a typical recreation and utility vehicle, the operator may not have the capability to easily and consistently control a vehicle speed, an engine speed and/or an output to an accessory. In some instances, the operator must rely on constantly modulating a throttle to control the engine speed, the vehicle speed or an accessory output speed.

Typically, a range of accessories may attach to the vehicle and connect to a transmission of the vehicle. The accessories may operate relatively less efficiently at inconsistent vehicle speeds or accessory output speeds. In some examples, it remains possible for the operator to fix or control the vehicle speed, the engine speed or accessory output speed manually.

SUMMARY

A control system for a vehicle having an accessory generally includes a transmission coupled to an engine and a power take-off unit having an output speed and an output torque. The power take-off unit is coupled to the transmission and adapted to releaseably couple to the accessory. A drivetrain is selectively coupled to the transmission and a control module controls at least one of the output speed and the output torque of the power take-off unit.

Further areas of applicability of the present teachings will become apparent from the detailed description and the claims provided hereinafter. It should be understood that the detailed description and specific examples, while indicating the various embodiments of the present teachings, are intended for purposes of illustration only and are not intended to limit the scope of the teachings.

BRIEF DESCRIPTION OF THE DRAWINGS

The present teachings will become more fully understood from the detailed description, the appended claims and the accompanying drawings, wherein:

DETAILED DESCRIPTION

The following description of the various embodiments is merely exemplary in nature and is in no way intended to limit the teachings, their application, or uses.

As used herein, the term module and/or device refers to an application specific integrated circuit (ASIC), a digital or analog electronic circuit, a processor (shared, dedicated or group) and memory that executes one or more software or firmware programs, a combinational logic circuit or other suitable components that provide the described functionality. Moreover, one or more modules may communicate with various sensors and/or engine components using digital or analog inputs and outputs and/or electrical and mechanical suitable communication networks, such as a J1939 based network.

Figure 1:
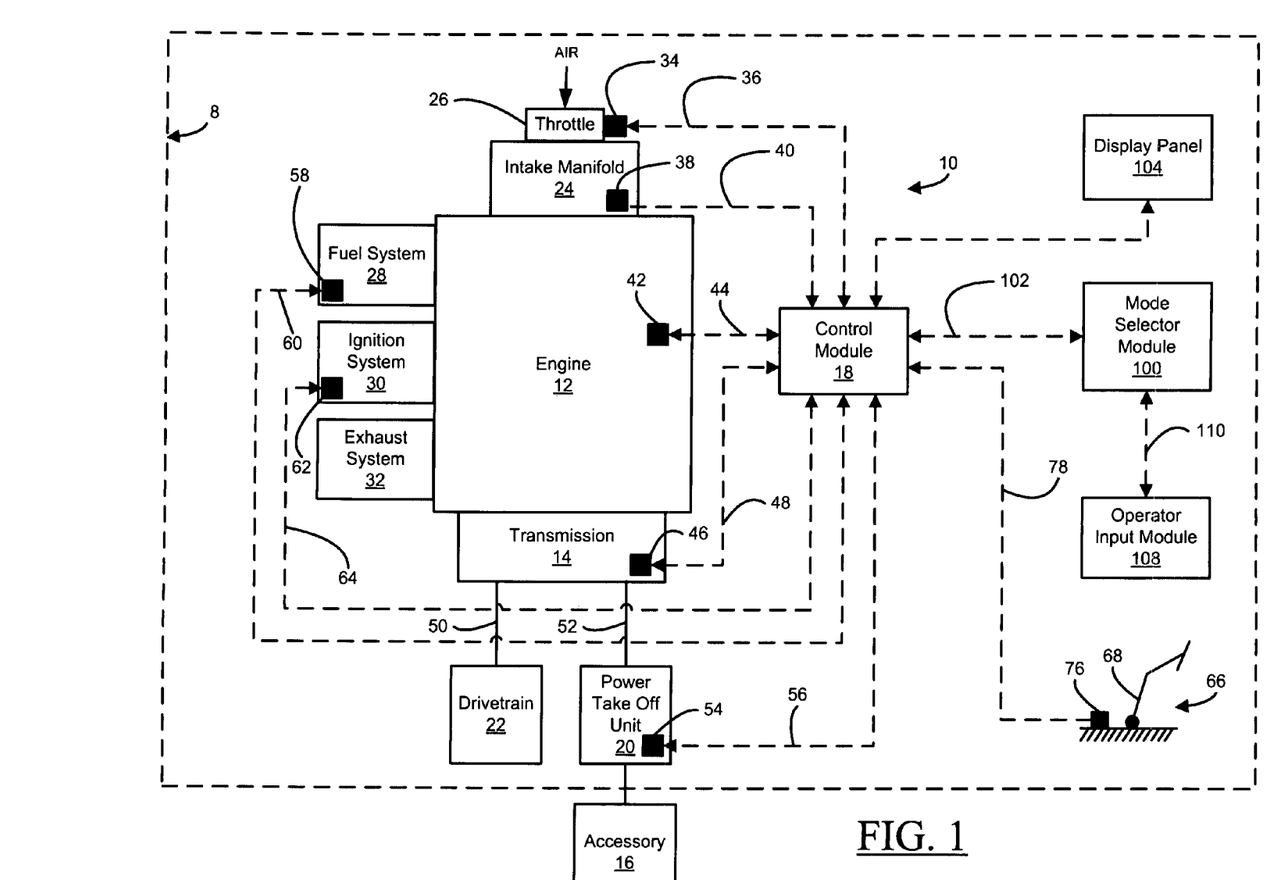
FIG. 1 is a schematic view of an engine, a transmission and an accessory constructed in accordance with the present teachings.
Figure 2:
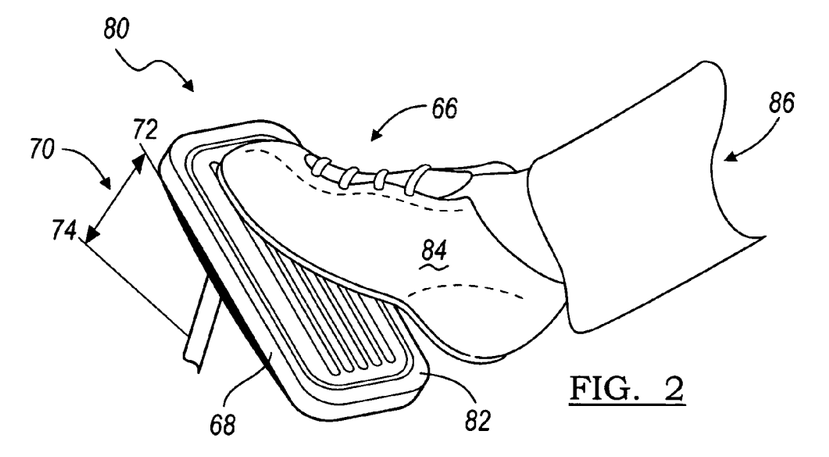
FIG. 2 is a perspective view of an accelerator assembly constructed in accordance with the present teachings showing a foot pedal assembly.

With reference to FIG. 1, a vehicle 8 includes an engine and transmission control system 10 that further includes an engine 12, which couples to a transmission 14. The engine and transmission control system 10 may be selectively engaged to control an engine speed and/or a transmission speed. Furthermore, the engine and transmission control system 10 may be selectively engaged to control a velocity of the vehicle 8 and/or control the output speed received by an accessory 16.

A control module 18 communicates with the engine 12, the transmission 14 and/or a power take-off unit 20 (which may be referred to as a PTO unit). The engine 12 and the transmission 14 may provide a torque output via a drivetrain 22 and/or the power take-off unit 20. The drivetrain 22 may selectively couple to any number of driven wheels (not shown) in a manner known in the art. The power take-off unit 20 has an output speed. The power take-off unit 20 may selectively couple to the accessory 16 to deliver the torque output thereto.

It will be appreciated that the engine and transmission control system 10 may be operable with (i.e., the drivetrain 22 may connect to) vehicles 8 that include tracks (e.g., a snow mobile), vehicles 8 with two, three, four, six, etc. wheels and water craft that may be propeller or jet driven. The transmission 14 may be selectively coupled (or decoupled) from the drivetrain 22 and/or the power take-off unit 20, for example, with a clutch (not shown) that may be integral to (or separate from) the transmission 14. It will also be appreciated that all or less than all of the wheels and/or treads may be connected to the drivetrain 22 (e.g., two-wheel drive in a four wheel vehicle). It will further be appreciated that while an internal combustion engine is illustrated, electric motors, internal combustion engines without throttles and other suitable torque-generating machines are operable with the various embodiments of the present teachings.

In one example, the engine 12 connects to an intake manifold 24 and a throttle 26, which may regulate airflow into the engine 12 in a manner known in the art. The engine 12 may also connect to a fuel system 28 and an ignition system 30 which may regulate combustion and thus engine power in a manner known in the art. The fuel system 28 may be comprised of one or more fuel components, including but not limited to, fuel pumps, fuel tanks, fuel filters, fuel lines, pressure regulators, fuel injectors, carburetors and/or other suitable components and combinations thereof. The engine 12 may connect to an exhaust system 32 to suitably vent combustion gases.

In one example, the throttle 26 may have one or more throttle body sensors 34, which may communicate a throttle body signal 36 to the control module 18. In one example, the throttle body signal 36 includes a throttle body position. The intake manifold 24 may have one or more intake manifold sensors 38, which may communicate an intake manifold signal 40 to the control module 18. In one example, the intake manifold signal 40 includes a manifold pressure, which, in turn, may be used to determine an engine load. The engine 12 may include one or more engine sensors 42, which may communicate an engine sensor signal 44 to the control module 18. In one example, the engine sensor signal 44 may include the engine speed (e.g., revolutions per minute), crankshaft angular position, engine phase, engine coolant temperatures, lubrication temperatures and/or pressure levels.

The transmission 14 may have one or more transmission sensors 46, which may communicate a transmission sensor signal 48 to the control module 18. In one example, the transmission sensor signal 48 may include a transmission gear (e.g., drive, reverse, low, first, second, etc.) and/or a transmission output speed. The transmission output speed may include the rotational velocity of a first output 50 and a second output 52. In one example, the first output 50 and the second output 52 are shafts (rigid, flexible, or combinations thereof) that selectively engage (i.e., couple to and decouple from) to the drivetrain 22 and the power take-off unit 20 respectively. It will be appreciated that a speed of the vehicle 8 may be determined based on the transmission 14, the drivetrain 22 and/or the rotational velocity of the first output 50. In one example, the transmission 14 is a continually-variable transmission. In a further example, the transmission 14 is a toroidal-type continually-variable transmission.

The power take-off unit 20 may have one or more power take-off sensors 54, which may communicate a power take-off signal 56 to the control module 18. The power take-off signal 56 may include the power take-off output speed and other applicable operating conditions of the power take-off unit 20, such but not limited to, connection (or disconnection) from the accessory 16. The power take-off unit 20 may also include a coupling (not shown) that may releaseably (or fixedly) connect to the accessory 16.

The accessory 16 may include an accessory coupling (not shown) that may releaseably (or fixedly) connect to the coupling on the power take-off unit 20. In one example, the accessory 16 may have wheels, tracks, skids, etc. to enable the accessory 16 to be towed behind the vehicle 8. In another example, the accessory 16 may be stationary and only powered by the vehicle 8 (i.e., not towed behind the vehicle 8). In one example, the accessory 16 may include various mechanisms that may benefit from torque delivered via the second output 52 and the power take-off unit 20, for example but not limited to, mower blades, hydraulic pumps, tillers, chippers, soil aerators, spreaders, etc. In one example, the accessory 16 may not couple to the power take-off unit 20 and just be towed by the vehicle 8.

The fuel system 28 may have one or more fuel system sensors 58, which may communicate a fuel system sensor signal 60 to the control module 18. In one example, the fuel system sensor signal 60 includes a fuel line pressure or fuel tank level amount. The ignition system 30 may have one or more ignition system sensors 62, which may communicate an ignition system sensor signal 64 to the control module 18. The engine and transmission control system 10 may control the speed and torque of the engine 12, the first output 50, the second output 52 and/or the speed of the vehicle 8 by adjusting ignition timing (e.g., retarding or advancing the spark) in the ignition system 30, fuel delivery (e.g., leaning or enriching fuel flow) from the fuel system 28 and/or regulating airflow to the engine by altering the throttle position of the throttle 26.

The above-mentioned control may be based on respective signals from throttle body sensor 34, the intake manifold sensor 38, the engine sensor 42, the transmission sensor 46, the fuel system sensor 58, the ignition system sensor 62, the power take-off sensor 54 and/or other suitable signals from the engine 12, the transmission 14, the accessory 16 and/or other components such as the exhaust system. While the engine and the transmission control system 10 may control the aforementioned parameters of the vehicle 8 (i.e., engine speed, transmission output speed, transmission output torque, vehicle speed, power take-off output speed and/or power take-off output torque), the control system 10 may be configured to control other engine, transmission, vehicle and/or accessory parameters, for example but not limited to wheel speed, track speed, mower blade speed, manifold pressure, engine power, spreader speed, etc.

In one example and with reference to FIGS. 1-4, an accelerator control assembly 66 includes a movable member 68 that is movable within a range of motion 70. The range of motion 70 may be defined by a first position 72 and a second position 74. The accelerator control assembly 66 may have an accelerator sensor 76 which may communicate an accelerator sensor signal 78 to the control module 18. The accelerator sensor signal 78 may communicate to the control module 18 a position of the movable member 68. In one example and with reference to FIG. 2, the accelerator control assembly 66 includes a foot pedal assembly 80. The foot pedal assembly 80 includes a foot pedal 82, which, for example, may be moved through the range of motion 70 by a foot 84 of a user 86.

Figure 3:
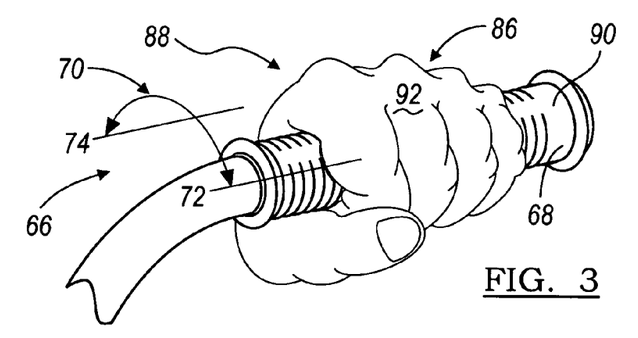
FIG. 3 is a perspective view of an alternative accelerator assembly constructed in accordance with the present teachings showing a twist-grip assembly.
Figure 4:
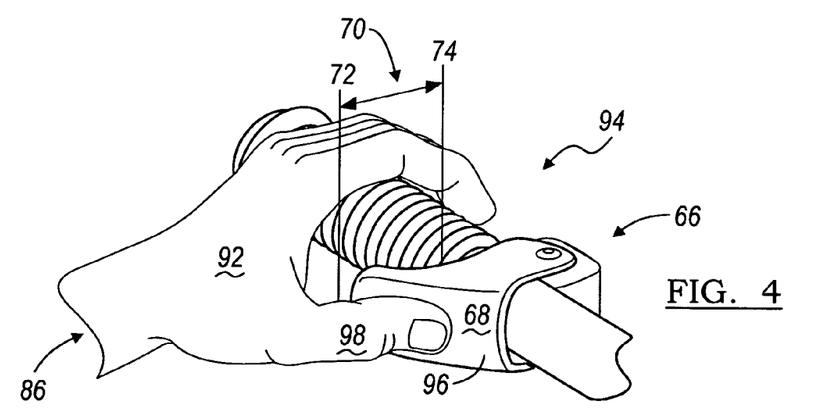
FIG. 4 is a perspective view of an alternative accelerator assembly constructed in accordance with the present teachings showing a thumb throttle assembly.

In another example and with reference to FIG. 3, the accelerator control assembly 66 includes a twist-grip assembly 88. The twist-grip assembly 88 includes a twist-grip 90, which, for example, may be moved through the range of motion 70 by a hand 92 of the user 86. In a further example and with reference to FIG. 4, the accelerator control assembly 66 includes a thumb assembly 94. The thumb assembly 94 may include a thumb throttle 96, which, for example, may be moved through the range of motion 70 by a thumb 98 of the user 86. It will be appreciated that various suitable accelerator control assemblies 66 may be used for example, but not limited to, a pull-knob, a lever, push-buttons, a joystick, slide-switches, combinations thereof and other suitable mechanisms.

Figure 5A:
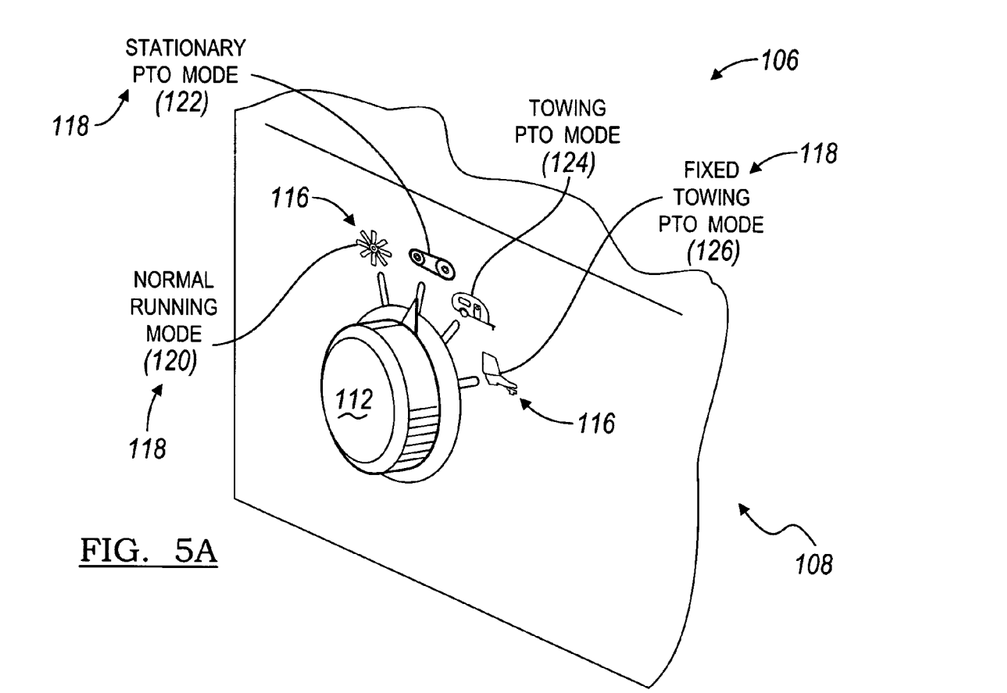
FIG. 5A is a partial perspective view of an operator input module constructed in accordance with the present teachings showing a mode selector dial.
Figure 5B:
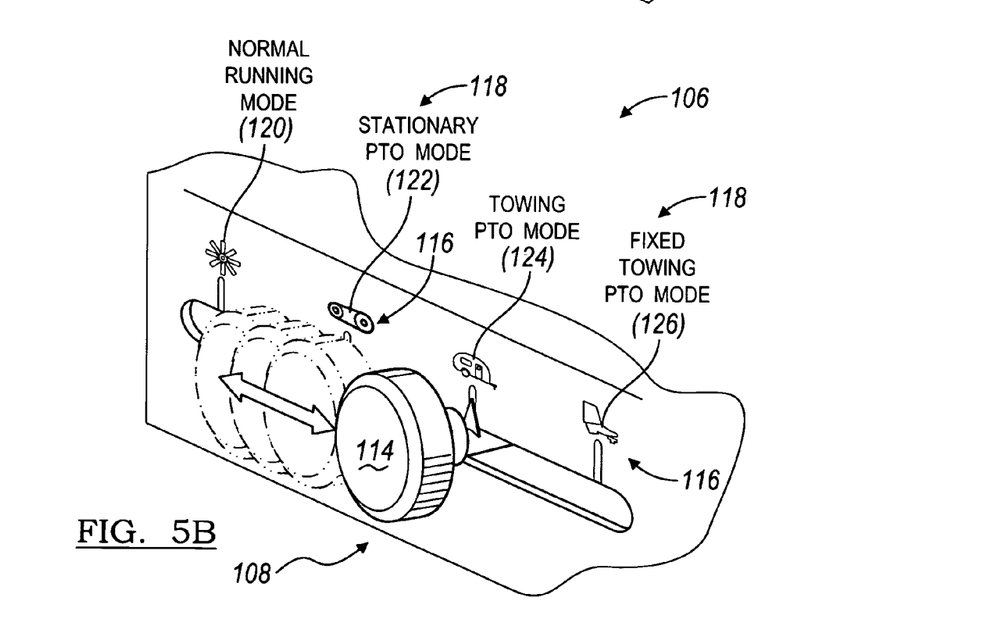
FIG. 5B is similar to FIG. 5A and shows an alternative operator input module including a mode selector knob.

In one example and with reference to FIGS. 1, 5A and 5B, a mode selector module 100 communicates a mode selection signal 102 to the control module 18. The control module 18 may communicate with a display panel 104 to indicate, for example, certain vehicle parameters and/or conditions of the engine and transmission control system 10. The display panel 104 may also display a certain mode 106 to which the mode selector module 100 has been selected. In one example, the mode selector module 100 is selectable between a plurality of engine and/or transmission modes 106. In another example, the mode selector module 100 is selectable between four modes 106.

In one example, an operator input module 108 may communicate an operator input signal 110 to the mode selector module 100, which may contain a selection of one of the modes 106. In one example and with reference to FIG. 5A, the operator input module 108 may include an input dial 112, which may be rotated to selectively activate one of the plurality of engine and/or transmission modes 106. In another example and with reference to FIG. 5B, the operator input module 108 may include a selector knob 114, which may be selectively moved (i.e., translated about horizontally as in illustrated in FIG. 5B) between each of the plurality of modes 106. With reference to FIGS. 5A and 5B, it will be appreciated that the modes 106 may be represented on the operator input module 108 graphically 116, with textual descriptions 118 and/or with various other combinations. It will also be appreciated that other operator inputs may be used to communicate the modes 106 to the mode selector module 100 such as a computer interface, push-buttons, a radio-control system and/or other suitable systems.

By way of the above examples and with reference to FIGS. 1-5B, a normal running mode 120 may be selected using the operator input module 108. In the normal running mode 120, a position of the throttle 26 may be directly proportional to a position of the movable member 68 of the accelerator control assembly 66. More specifically, the user 86 may move the movable member 68 through the range of motion 70 defined by the first position 72 and the second position 74. As the movable member 68 is moved, the accelerator sensor 76 communicates the position of the movable member 68 to the control module 18. The control module 18 communicates with the throttle body sensor 34 to adjust the throttle 26 to a fixed position reflexive of the movable member 68.

The range of motion 70 of the movable member 68 and the range of motion (not shown) of the throttle body may be proportional to a range of engine speeds defined by a minimum engine speed and a maximum engine speed and a range of transmission speeds defined by a minimum transmission speed and a maximum transmission speed. In the normal running mode 120, therefore, the user 86 may adjust the accelerator control assembly 66 (i.e., move the movable member 68) to accelerate the vehicle 8 up to its maximum engine speed and/or maximum transmission speed (i.e., a maximum vehicle speed and/or a maximum drivetrain speed). Moreover, the speed of the second output 52 may be proportional to the position of the movable member 68 or may be disconnected from the transmission when an accessory is not in use.

It will be appreciated that the present teachings remain operable with an engine that lacks a throttle (e.g., a diesel engine) as other applicable fuel controls may be adjusted. By way of the above examples and without regard to the type of engine used, the normal running mode 120 permits the engine and transmission control system 10 to operate the vehicle 8 and/or the accessory 16 in a normal fashion such that the range of motion 70 of the movable member 68 correlates generally with a minimum and a maximum vehicle speed and a minimum and a maximum power take-off output speed.

In one example, the mode selector module 100 may be selected to a stationary power take-off mode 122 using the operator input module 108. The stationary power take-off mode 122 may decouple the drivetrain 22 from the transmission 14 and couple the power take-off unit to the transmission 14. It will be appreciated that the power take-off unit 20 and the drivetrain 22 may always remain connected to the transmission 14 but when either are decoupled therefrom, a torque output may be interrupted with, for example, a clutch. In one example, the control module 18 may engage a brake (e.g., a parking brake) and/or lock the first output 50 to hold the vehicle 8 stationary while in the stationary power take-off mode 122. By way of the above example, an interlock system may be engaged to ensure the brake is engaged in the stationary power take-off mode 122.

In one example, the stationary power take-off mode 122 may hold the speed of the second output 52 about constant, thus providing a constant rotational velocity to the accessory 16 via the power take-off unit 20. It will be appreciated that speed reduction units may be employed such that transmission output speeds may not (or may) be equal to power take-off output speeds. In one example, the user 86 may move the movable member 68 through the range of motion 70 defined by the first position 72 and the second position 74, which may provide varying degrees of engagement between the transmission 14 and the power take-off unit 20 (e.g., adjust clutch slippage) to thus supply varying degrees of torque delivered to the power take-off unit 20. In another example, the control module 18 may disable the accelerator control assembly 66, such that engine speed and/or engine power is held constant regardless of the position of the movable member 68. In a further example, the control module 18 may hold the position of the moveable member 68 at a position commensurate with the engine speed in the stationary power take-off mode 122.

In one example, the speed and/or torque of the second output 52 may be about equal to a predetermined constant (or value) which may be, for example, stored in the mode selector module 100. In another example, the speed and/or torque of the second output 52 may be set by user 86 through the operator input module 108. By way of the above example, the operator input module 108 may include various suitable output speed input methods such as, but not limited to, thumb-wheels, knobs, computer-interface and/or push buttons.

In one example, the mode selector module 100 may be selected to a towing power take-off mode 124 using the operator input module 108. In the towing power take-off mode 124, the speeds and or torques of the outputs 50, 52 to the drivetrain 22 and/or the power take-off unit 20 respectively may be limited and/or fixed. The movable member 68 may be moved by the user 86 through the range of motion 70 defined by the first position 72 and the second position 74. In one example, the position of the moveable member 68 controls vehicle speed and/or the output speed of the drivetrain. By way of the above example, the vehicle speed will increase as the moveable member is moved toward the second position 74 from the first position 72 but the speed of the second output 52 will remain about constant.

In another example, the control module 18 in the towing power take-off mode 124 adjusts the second position 74 to correlate with a predetermined value that may be a reduced maximum engine speed. By way of the above example, the vehicle speed (i.e., the speed of the first output 50) will increase as the moveable member is moved toward the second position 74 from the first position 72 but not exceed the reduced maximum engine speed. In one example, the reduced maximum engine speed can be a predetermined constant (or value) which may be, for example, stored in the mode selector module 100. In another example, the reduced maximum engine speed may be set by user 86 through the operator input module 108. By way of the above example, the operator input module 108 may include various suitable speed input methods such as, but not limited to, thumb-wheels, knobs, computer-interface and/or push buttons.

In one example, the control module 18, when the mode selector module 100 is in the towing power take-off mode 124, may hold the engine speed at a predetermined rotational speed. By way of the above example, the control module 18 may hold the movable member 68 in a position based on the predetermined engine rotational speed. The control module 18 may also hold the engine 12 at the predetermined engine rotational speed independent of the position of the movable member 68. In one example, the user 86 may manually adjust the rotational speed of the engine 12 (i.e. increase engine speed with the moveable member 68) and set that speed as the reduced maximum engine speed or the predetermined value. In another example, the mode selector module 100 may include certain preset engine speeds and/or ranges that the user 86 may select to set the reduced maximum engine speed.

In one example, the mode selector module may be selected to a fixed towing power take-off mode 126 using the operator input module 108. By way of the above example, the control module 18 may fix or hold the speed of the engine 12, the vehicle 8, the drivetrain 22, the first output 50 and/or the second output 52. In one example, the control module 18 may hold the speed of the first output 50 and the second output 52 about constant. In another example, the control module 18 may limit the speed of the first output 50 and the second output 52 to a constant or predetermined value. In a further example, the control module 18 may hold the speed of the vehicle 8, the drivetrain 22 and the speed of the engine 12 constant. In yet another example, the control module 18 may limit the speed of the vehicle 8, the drivetrain 22 and the speed of the engine 12 to a constant or a predetermined value.

By way of the above examples, the fixed towing power take-off mode 126 may hold the movable member 68 in a position based on the predetermined speed of the first output 50, the second output 52, the vehicle 8 and/or the engine 12. The fixed towing power take-off mode 126 may also hold the vehicle 8 and/or the output speed of the drivetrain 22 at the predetermined vehicle speed independent of the position of the movable member 68.

In one example, the predetermined speed of the first output 50, the second output 52, the vehicle 8, the drivetrain 22 and/or the engine 12 may be a predetermined constant which may be, for example, stored in the mode selector module 100. In another example, the speed of the first output 50, the second output 52, the vehicle 8 and/or the engine 12 may be set by user 86 through the operator input module. By way of the above example, the operator input module 108 may include various suitable vehicle speed and/or transmission output speed input methods such as, but not limited to, thumbwheels, knobs, computer-interface and/or push buttons. In one example, the user 86 may manually adjust the vehicle speed (i.e., increase the vehicle speed with the moveable member 68) and set that speed as the fixed vehicle speed and/or the speed of the first output 50. By way of the above example, the speed of the second output 52 may be commensurate to the above mentioned user-set speed of the engine 12 or fixed at a predetermined speed. In another example, the mode selector module 100 may include certain preset vehicle speeds and/or ranges and/or transmission output speed and/or ranges that the user 86 may select to set accordingly.

In one example, the mode 106 may be displayed on the display panel 104 to alert the user 86 as to what mode 106 the operator input module 108 has been selected. In another example, the engine speed and/or the transmission output speed to the drivetrain 22 and/or the power take-off unit 20 may also be indicated on the display panel 104 to alert the user 86. In a further example, the choice of modes 120, 122, 124, 126 may be locked so the user 86 may not readily change the mode 106 during operation of the vehicle 8 or the accessory 16. By way of the above example, a key and/or pass code feature may be used to lock the mode 106 from changing.

Those skilled in the art may now appreciate from the forgoing description that the broad teachings may be implemented in a variety of forms. While the present teachings have been described in connection with particular examples thereof, the true scope of the teachings should not be so limited because other modifications will become apparent to the practitioner upon a study of the drawings, the specification and the following claims.

What is claimed is:

1. A control system for a vehicle having an accessory, the control system comprising:
    a continually variable transmission coupled to an engine;
    a power take-off unit having an output speed and an output torque, said power take off unit coupled to said continually variable transmission and adapted to releaseably couple to the accessory;
    a drivetrain selectively coupled to said continually variable transmission;
    a mode selection module having a plurality of modes including at least one selected mode; and
    a control module detects which of the plurality of modes is the at least one selected mode and controls at least one of said output speed and said output torque of said power take off unit based on the selected mode.

2. The control system of claim 1 wherein said controlling at least one of said output speed and said output torque of said power take-off unit includes holding at least one of said output speed and said output torque about constant.

3. The control system of claim 1 wherein said controlling at least one of said output speed and said output torque of said power take-off unit includes limiting at least one of said output speed and said output torque to about a predetermined value.

4. The control system of claim 1 wherein said power take off unit is selectively coupled to said continually variable transmission.

5. The control system of claim 1 wherein said continually variable transmission is a toroidal type continually variable transmission.

6. The control system of claim 4 further comprising an accelerator assembly having a movable member movable within a range of motion defined by a first position and a second position.

7. The control system of claim 6 wherein said movable member of said accelerator assembly is at least one of a foot pedal, a thumb lever, a twist grip, a pull-knob, a lever, a joystick and combinations thereof.

8. A control system for a vehicle having an accessory, the control system comprising:
    a transmission coupled to an engine;
    a power take-off unit having an output speed and an output torque, said power take off unit coupled to said transmission and adapted to releaseably couple to the accessory; said power take off unit being selectively coupled to said transmission;
    a drivetrain selectively coupled to said transmission;
    an accelerator assembly having a movable member movable within a range of motion defined by a first position and a second position;
    a mode selection module having a plurality of modes including at least one selected mode; and
    a control module detects which of the plurality of modes is the at least one selected mode and controls at least one of said output speed and said output torque of said power take off unit based on the selected mode,
    wherein the plurality of modes includes at least a first mode and a second mode, said mode selector module in said first mode decouples said drivetrain from said transmission, couples said power take off unit to said transmission and controls at least one of said output speed and said output torque of said power take off unit, said mode selector module in said second mode controls at least one of said output speed and said output torque of said power take-off unit, wherein an output speed of said drivetrain is based on a position of said movable member.

9. The control system of claim 8 wherein said mode selector module in said first mode holds at least one of said output speed and said output torque of said power take off unit about constant.

10. The control system of claim 8 wherein said mode selector module in said first mode limits at least one of said output speed and said output torque of said power take off unit to about a predetermined value.

11. The control system of claim 8 wherein said node selector module in said second mode holds at least one of said output speed and said output torque of said power take off unit about constant.

12. The control system of claim 8 wherein said mode selector module includes a third mode, said mode selector module in said third mode controls at least one of said output speed and said output torque of said power take off unit and controls at least one of said output speed and said output torque of said drivetrain.

13. The control system of claim 12 wherein said mode selector module in said third mode limits at least one of said output speed and said output torque of said power take off unit to about a predetermined value.

14. The control system of claim 12 wherein said mode selector module in said third mode limits at least one of said output speed and said output torque of said drivetrain to about a predetermined value.

15. The control system of claim 12 wherein said mode selector module in said third mode holds at least one of said output speed and said output torque of said power take off unit about constant.

16. The control system of claim 12 wherein said mode selector module in said third mode holds at least one of said output speed and said output torque of said drivetrain about constant.

17. The control system of claim 8 wherein said mode selector module in said second mode limits at least one of said output speed and said output torque of said power take off unit to about a predetermined value.

18. A control system for a vehicle having an accessory, the control system comprising:
an engine having a minimum engine speed and a maximum engine speed;
a transmission coupled to said engine;
a power take-off unit having an output speed and an output torque, said power take off unit selectively coupled to said transmission and adapted to releaseably couple to the accessory;
a drivetrain selectively coupled to said transmission, said drive train having an output speed and an output torque;
an accelerator assembly having a movable member movable within a range of motion defined by a first position and a second position; and
a control module that couples said drivetrain and said power take off unit to said transmission, that controls at least one of said output speed and said output torque of said power take off unit and that controls at least one of said output speed and said output torque of said drivetrain, wherein said control module limits said output torque of said drivetrain to about a predetermined value.

19. The control system of claim 18 wherein said control module holds at least one of said output speed and said output torque of said power take off unit about constant.

20. The control system of claim 18 wherein said control module holds at least one of said output speed and said output torque of said drivetrain about constant.

21. The control system of claim 18 wherein said control module limits at least one of said output speed and said output torque of said power take off unit to about a predetermined value.

22. The control system of claim 18 wherein the speed of the vehicle is based off said output speed of said drivetrain.

23. The control system of claim 22 wherein the vehicle has a minimum speed and a maximum speed and said control module limits said speed of the vehicle to about a predetermined value that is less than said maximum speed.

24. The control system of claim 23 wherein said control module associates said second position with said predetermined value, which is less than said maximum vehicle speed.

25. The control system of claim 24, wherein said range of motion remains constant.

26. The control system of claim 18 wherein said control module controls an engine speed, said control includes one of holding said engine speed about constant and limiting said engine speed to about a predetermined value.

27. A vehicle having an engine, an accessory and a vehicle control system comprising:
a transmission having a first output and a second output, said second output selectively coupled to the accessory;
a drivetrain selectively coupled to said first output; and
a mode selector module having at least a first mode, a second mode and a third mode,
said mode selector module in said first mode decouples said drivetrain from said transmission and holds a speed of said second output about constant or limits said speed of said second output to below a predetermined value,
said mode selector module in said second mode couples said drivetrain to said transmission and holds said speed of said second output about constant or limits the said speed of said second output to below said predetermined value and
said mode selector module in said third mode at least one of
holds said speed of said first output and said second output about constant,
limits said speed of said first output and said second output to below said predetermined value,
holds said speed of the first output about constant and limits said speed of the second output to below said predetermined value, and
limits said speed of the first output to below said predetermined value and holds said speed of the second output about constant.

28. The vehicle of claim 27 further comprising an accelerator assembly having a movable member movable within a range of motion, said range of motion defined by a first position based on a minimum engine speed and a second position based on a maximum engine speed.

29. The vehicle of claim 28 wherein a speed of the vehicle in said second mode is based on a position of said moveable member.

30. A vehicle having a vehicle control system, an engine and a transmission with a first output that selectively couples to a drivetrain and a second output that selectively couples an accessory, the vehicle control system comprising:
- a mode selector module having at least a first mode, a second mode and a third mode,
  - said mode selector module in said first mode decouples the drivetrain from the transmission and holds a speed of the second output about constant or limits said speed of the second output to below a predetermined value,
  - said mode selector module in said second mode couples the drivetrain to the transmission and holds said speed of the second output about constant or limits said speed of the second output to below said predetermined value and
  - said mode selector module in said third mode at least one of
    - holds said speed of the first output and the second output about constant,
    - limits said speed of the first output and the second output to below said predetermined value,
    - holds said speed of the first output about constant and limits said speed of the second output to below said predetermined value, and
    - limits said speed of the first output to below said predetermined value and holds said speed of the second output about constant.

31. The vehicle of claim 30 further comprising an accelerator assembly having a movable member movable within a range of motion, said range of motion defined by a first position based on a minimum engine speed and a second position based on a maximum engine speed.

32. The vehicle of claim 31 wherein a speed of the vehicle is based on a position of said moveable member in said second mode.

33. A method of controlling an engine and a transmission with a first output that selectively couples to a drivetrain and a second output that selectively couples to an accessory, the method comprising:
- detecting at least a first mode, a second mode and a third mode;
- decoupling the drivetrain from the transmission in said first mode and holding a parameter of the second output about constant or limiting said parameter of the second output to below a predetermined value;
- coupling the drivetrain to the transmission in said second mode and holding said parameter of the second output about constant or limiting said parameter of the second output to below said predetermined value; and
- in said third mode holding a parameter of the first output about constant or limiting said parameter of the first output below said predetermined value, wherein said parameter of the said second output is held about constant or limited below said predetermined value.

34. The method of claim 33 wherein said parameter of said second output is an output speed or an output torque.

35. The method of claim 33 wherein said parameter of said first output is speed or torque.

36. The method of claim 33 further comprising providing a movable member movable within a range of motion defined by a first position based on a minimum engine speed and a second position based on a maximum engine speed.

37. The method of claim 36 wherein a speed of the vehicle in said second mode is based on a position of said moveable member.

38. A control system for a vehicle having an accessory, the control system comprising:
- a transmission coupled to an engine;
- a power take-off unit having an output speed and an output torque, said power take off unit selectively coupled to said transmission and adapted to releaseably couple to the accessory;
- a drivetrain selectively coupled to said transmission;
- a control module controls at least one of said output speed and said output torque of said power take off unit; and
- an interlock system connected to said control module, said control module decouples said drivetrain and couples said power take off unit to said transmission when said interlock system is in an activated condition.

39. The control system of claim 38, wherein the transmission is a continually variable transmission.

40. The control system of claim 38, wherein said control module holds said output speed of said power take off unit about constant.

41. The control system of claim 38, wherein said control module holds said output torque of said power take off unit about constant.

42. The control system of claim 38, wherein said control module holds at least one of said output speed and said output torque of said power take off unit at about a predetermined constant which is stored in memory of the control system.

43. A control system for a vehicle having an accessory, the control system comprising:
- a transmission coupled to an engine;
- a power take-off unit having an output speed and an output torque, said power take off unit selectively coupled to said transmission and adapted to releaseably couple to the accessory;
- a drivetrain selectively coupled to said transmission;
- a control module controls at least one of said output speed and said output torque of said power take off unit; and
- a brake that holds the vehicle from moving when said control module decouples said drivetrain and couples said power take off unit to said transmission.

44. The control system of claim 43, wherein the transmission is a continually variable transmission.

45. The control system of claim 43, wherein said control module holds said output speed of said power take off unit about constant.

46. The control system of claim 43, wherein said control module holds said output torque of said power take off unit about constant.

47. The control system of claim 43, wherein said control module holds at least one of said output speed and said output torque of said power take off unit at about a predetermined constant which is stored in memory of the control system.

* * * * *

UNITED STATES PATENT AND TRADEMARK OFFICE
CERTIFICATE OF CORRECTION

PATENT NO.         : 7,399,255 B1
APPLICATION NO.    : 11/150573
DATED              : July 15, 2008
INVENTOR(S)        : Chad B. Johnson et al.

It is certified that error appears in the above-identified patent and that said Letters Patent is hereby corrected as shown below:

In Column 9, Line 18, delete the word "node" and insert --mode--.

Signed and Sealed this

Fifth Day of May, 2009

JOHN DOLL
*Acting Director of the United States Patent and Trademark Office*